United States Patent [19]

Rangabe

[11] 4,082,213

[45] Apr. 4, 1978

[54] METHOD OF MOUNTING A PARTICLE ON A SUPPORT MEMBER

[76] Inventor: Alexander Rizo Rangabe, 'Stoneacre', Denmead, Portsmouth, Hampshire, England

[21] Appl. No.: 747,006

[22] Filed: Dec. 2, 1976

Related U.S. Application Data

[62] Division of Ser. No. 526,237, Nov. 22, 1974, Pat. No. 4,001,519.

[30] Foreign Application Priority Data

Nov. 23, 1973  United Kingdom ............... 54415/73

[51] Int. Cl.² ............................................. B23K 31/02
[52] U.S. Cl. ................................. 228/171; 51/216 R; 228/172; 269/7
[58] Field of Search ............... 228/170, 171, 172, 175; 51/216 R, 323; 29/424, 559, 469.5; 269/7; 156/154–155; 179/100.41 R, 100.41 G

[56] References Cited

U.S. PATENT DOCUMENTS

| 995,537 | 6/1911 | Hertner | 269/7 |
|---|---|---|---|
| 3,187,444 | 6/1965 | Lehmann | 269/7 X |
| 3,319,289 | 5/1967 | McCormick | 269/7 X |
| 3,579,807 | 5/1971 | Matulewicz | 228/170 |
| 3,660,949 | 5/1972 | Coes | 269/7 |
| 3,763,611 | 10/1973 | Dühring | 51/216 R X |
| 3,897,535 | 7/1975 | Lapac | 269/7 X |

*Primary Examiner*—Donald G. Kelly
*Attorney, Agent, or Firm*—Leydig, Voit, Osann, Mayer & Holt Ltd.

[57] ABSTRACT

The method of mounting a particle on a support member comprises mounting a mass of material from which the particle is derived on a carrier element and then shaping the mass of material to form an assembly of the particle on the element. The assembly is located in a predetermined attitude relatively to a body of liquid substance which is solidified around the particle. Next, most if not all of the material exterior to the solidified substance is removed and a support member then attached to the remaining part of the assembly. Finally, the solidified liquid substance is removed from the assembly.

13 Claims, 9 Drawing Figures

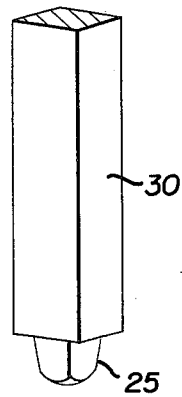 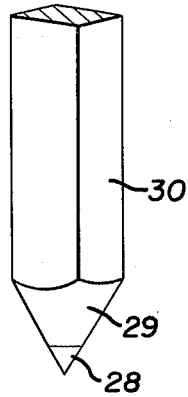 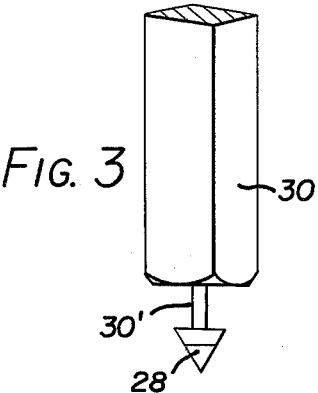
FIG. 1  FIG. 2  FIG. 3
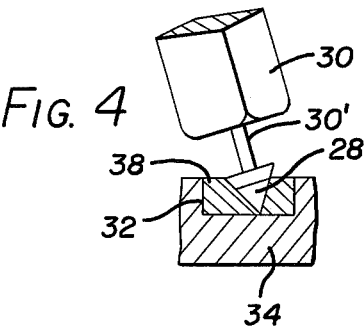 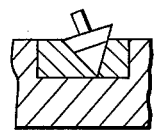
FIG. 4  FIG. 6
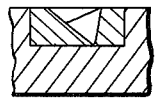 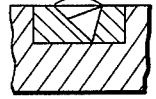 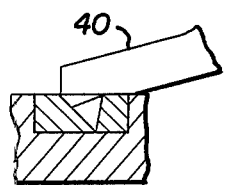
FIG. 7  FIG. 8  FIG. 9
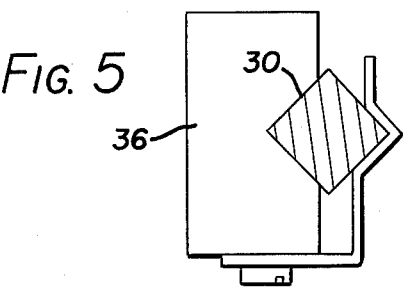
FIG. 5

METHOD OF MOUNTING A PARTICLE ON A SUPPORT MEMBER

This application is a divisional application from application Ser. No. 526,237 of Alexander Rizo Rangabe filed Nov. 22, 1974 issued as U.S. Pat. No. 4,001,519.

This invention relates to the mounting of a particle on a support member. The mounting of particles on support members because of the smallness of the particles can present difficulties. One familiar example of the incidence of these difficulties is in the mounting of a stylus tip on a stylus arm, the stylus being for use in the cartridge of the tone arm of a disc record player.

It is an object of the present invention to provide a method of mounting a particle on a support member in which the difficulties of handling the particle are minimised. A further object is to provide a method of mounting a particle on a support member which is especially useful in the context of mounting a stylus tip on a stylus arm.

The present invention consists in the method of mounting a particle of solid material on a support member comprising fixedly securing on a carrier element a mass of material from which the particle is derived, supporting the carrier element to enable machining of said mass of material from which the particle is to be formed machining the mass of material to reduce the latter to the required particle from thus providing an a-sembly of the particle on the carrier element, locating the carrier element with the particle disposed in a mould cavity, filling the mould cavity with a solidifiable liquid substance with the particle at least partly immersed in the substance, causing the substance to solidify, removing at least most of the assembly exterior to the solidified substance, attaching a support member exteriorly of the solidified substance on the remaining part of the assembly, and, removing the solidified liquid substance.

Advantageously, the method of the invention includes, when machining the mass of the material from which the particle is derived, also machining the adjoining part of the carrier element to form the assembly of the particle on the element.

Suitably, the assembly is located relatively to the solidifiable liquid substance in the mould cavity so that the particle of an adjoining part of the carrier element between the particle and the neck are immersed in the liquid.

The invention further consists in the method of attaching a stylus tip to a stylus arm, comprising the steps of fixedly securing to a carrier element a mass of material from which the tip is formed, supporting the carrier element to enable machining of the said mass of material, machining the mass of material thereby to provide an assembly of the tip on the carrier element, locating the carrier element with the particle disposed in a mould cavity, filling the mould cavity with a solidifiable liquid substance with the tip at least partly immersed in the substance, causing the substance to solidify, removing at least most of the assembly exterior to the solidified substance, attaching a stylus arm exteriorly of the solidified substance on the remaining part of the assembly, and, removing the solidified liquid substance.

Suitably, when forming the assembly, the tip is formed to an elliptical section.

The invention will now be described, by way of example, with reference to the accompanying drawings in which FIGS. 1 - 4 and FIGS. 6 - 9 illustrate successive steps in the method according to the invention of mounting a particle on a support member, whilst FIG. 5 is a plan view of apparatus used in the method according to the invention.

Referring to the drawings, the method according to the invention of mounting a particle on a support member is exemplified by reference to a method of mounting a stylus tip on a stylus arm. It will be understood, however, that the method is not so restricted and is indeed applicable generally to the mounting of a particle on a support member.

Throughout the drawings like parts have been accorded the same reference numerals.

As seen in FIG. 1, a carrier element 30 in the form of a metallic rod of rectangular cross-section has secured within a recess in an end face thereof by suitable brazing material a mass 25 of diamond from which a stylus tip 28 is to be formed. The end portion of the rod 30 and the mass 25 are then ground together into a conical configuration so as to form the stylus tip 28 on a part 29 of the rod 30 which is coextensive with the stylus 28.

At this stage the stylus tip 28 can be ground into elliptical form if desired; for this purpose, the rod 30 is preferably of rectangular section to enable a known orientation to be established between the rod and the elliptical configuration of the tip.

Next, see FIG. 3, a portion of the rod 30 adjacent to the stylus tip is ground to form a reduced diameter neck or shank 30' so as to leave attached immediately adjacent to the tip 28 a small conical section of the rod 30.

The ground stylus tip 28 is then inserted into recess 32 in a mould block 34 such that the tip 28 of the diamond is supported by the bottom surface of the recess 32. The upper end portion of the rod 30 is held in a suitable jig 36 and is orientated with respect to the block 34 so that the vertical plane containing the axis of the rod 30 is normal to the plane of the upper face of the block 34. The rod 30 is seated in the jig 36 so that the elliptical form (if provided) of the tip 28 is in predetermined orientation with respect to the block 34. The recess 32 is filled with a cement 38 in fluid form which embeds the tip 28 and part of the adjoining conical portion of the rod 30. The cement is solidified after which the shank portion 30' of the rod 30 is cut (FIG. 6), the tip 28 remaining accurately located within the recess 32 by means of the cement filling 38.

Preferably, the cement 28 is an ultra-high temperature, ultra strong epoxy, such as that manufactured by Ciba-Geigy (U.K.) Ltd. and sold under the Trade Name "ARALDITE A.T.I." A pellet of unpolymerised epoxy is located in the recess 32 and is heated to 120°-130° C, at which temperature the pellet melts and the melted epoxy embeds the tip 28. Upon increasing the temperature to 240°-250° C and maintaining this temperature for about 30 minutes, the epoxy will polymerise and solidify around the ground tip.

The material exterior to the solidified cement 38 is now removed by grinding level with the upper surface of the cement 38 (see FIG. 7). It will be noted that the tip 28 at this time still retains, covering its upper surface, material from the rod 30. The surface of the tip which is now flush with the upper surface of the body of cement 38 is tinned as at 35 whereupon a stylus arm 40 suitably of beryllium is secured to the tip by normal soft soldering technique. It will be noted that the underside of an end portion of the stylus arm 40 is ground flat to facilitate its attachment to the tip. In applying the soft soldering technique, the arm 40 is dipped into a brazing alloy at a temperature above 600° C, the ground metallic surface which has been tinned as at 35 being then soldered to the coated beryllium. The brazing alloy can, for example, be a high zinc brazing alloy such as that sold under the Trade Name "Thescal". With the tip thus attached to the stylus arm, the cement 38 can be removed by treating with a suitable material, for example, tetrahydrofuran in the case of epoxy cement.

In an alternative arrangement the tip 28 can be attached to the stylus arm by an epoxy or other suitable adhesive. In this case, in place of using the epoxy cement described to embed the tip, wax or other substances from which the tip can be readily removed can be employed. In the case of wax, for example, the tip can be removed after attachment to the stylus arm by melting the wax.

In the method described above, although the tip is very small difficulties which would otherwise arise in handling and accurately locating the tip are minimised. As will be apparent, this process can be used for attaching tips to stylus arms of a wide range of tone arm cartridges.

It will be apparent that many modifications may be made without departing from the scope of the invention. For example, it is not essential that part of the rod 30 should remain attached to the tip 28 particularly if the latter is of some material other than diamond. If the material of the tip 28 is compatible with that of the arm 40, in the sense of being capable of being adhesively bonded or soldered to the arm, the need for intervening material between the tip and the arm 40 is eliminated.

It will further be apparent that the method described is applicable generally to the attachment of small particles of supporting members.

I claim:

1. The method of mounting a particle of solid material on a support member comprising fixedly securing on a carrier element a mass of material from which the particle is derived, supporting the carrier element to enable machining of said mass of material from which the particle is to be formed, machining the mass of material to reduce the latter to the required particle form thus providing an assembly of the particle on the carrier element, locating the carrier element with the particle disposed in a mould cavity, filling the mould cavity with a solidifiable liquid substance with the particle at least partly immersed in the substance, causing the substance to solidify, removing at least most of the assembly exterior to the solidified substance, attaching a support member exteriorly of the solidified substance on the remaining part of the assembly, and, removing the solidified liquid substance.

2. The method claimed in claim 1, which includes, when machining the mass of material from which the particle is derived, also machining and an adjoining part of the carrier element to form the assembly of the particle on the element.

3. The method claimed in claim 2, which includes reducing the carrier element to form a neck on which is carried a head formed by the particle and an adjacent part of the element.

4. The method claimed in claim 3, which includes, subsequently to causing the liquid substance to solidify, severing the head from the carrier element by cutting the neck and then grinding away material of the carrier element.

5. The method as claimed in claim 4, which includes when locating the assembly relatively to the solidifiable liquid substance so locating the assembly that the particle and an adjoining part of the carrier element between the particle and the neck are immersed in the liquid.

6. The method claimed in claim 5 which includes forming the attachment of the support member to the remaining part of the carrier element by soldering or brazing the support member to said remaining part of the carrier element.

7. The method claimed in claim 1, which includes filling the mould cavity with liquid cement the latter constituting the solidifiable substance, and, after attaching of the support member, chemically removing the cement.

8. The method of attaching a stylus tip to a stylus arm, comprising the steps of fixedly securing to a carrier element a mass of material from which the tip is formed, supporting the carrier element to enable machining of the said mass of material, machining the mass of material thereby to provide an assembly of the tip on the carrier element, locating the carrier element with the particle disposed in a mould cavity, filling the mould cavity with a solidifiable liquid substance with the tip at least partly immersed in the substance, causing the substance to solidify, removing at least most of the assembly exterior to the solidified substance, attaching a stylus arm exteriorly of the solidified substance on the remaining part of the assembly, and, removing the solidified liquid substance.

9. The method claimed in claim 8, which includes, when machining the mass forming the tip to an elliptical configuration.

10. The method claimed in claim 9, which includes when machining the mass of material from which the tip is formed also machining and an adjoining part of the carrier element to form the assembly of the particle on the element.

11. The method claimed in claim 10, which includes after reducing the carrier element to form a neck on which is carried a head formed by the stylus tip and an adjacent part of the element.

12. The method claimed in claim 11, which includes subsequently to causing the liquid substance to solidify, severing the head from the carrier element by cutting the neck and then grinding away material exterior to the solidified substance.

13. The method claimed in claim 12, which includes locating the assembly relatively to the mould cavity so that the tip and adjoining part of the carrier element between the tip and the neck are immersed in the liquid in the mould cavity.

* * * * *